United States Patent [19]

Morimoto

[11] Patent Number: 5,388,778
[45] Date of Patent: Feb. 14, 1995

[54] CLUTCH CONTROL STRUCTURE FOR A FISHING REEL

[75] Inventor: Shinichi Morimoto, Nishinomiya, Japan

[73] Assignee: Shimano Inc., Osaka, Japan

[21] Appl. No.: 959,599

[22] Filed: Oct. 13, 1992

[30] Foreign Application Priority Data

Oct. 18, 1991 [JP] Japan .................. 3-84993[U]

[51] Int. Cl.6 ............................................ A01K 89/00
[52] U.S. Cl. ............................................ 242/261
[58] Field of Search ............... 242/261, 262, 260, 259

[56] References Cited

U.S. PATENT DOCUMENTS

| | | | |
|---|---|---|---|
| 4,406,427 | 9/1983 | Murakami | 242/261 |
| 4,564,158 | 1/1986 | Moosberg et al. | 242/261 |
| 5,188,321 | 2/1993 | Sato | 242/261 |
| 5,246,187 | 9/1993 | Noda | 242/261 |
| 5,275,353 | 1/1994 | Morimoto | 242/261 |

*Primary Examiner*—Stanley N. Gilreath
*Assistant Examiner*—Eileen A. Dunn
*Attorney, Agent, or Firm*—Dickstein, Shapiro & Morin

[57] ABSTRACT

A clutch control structure for a fishing reel includes a clutch controller for operating a clutch mechanism mounted in a rotational drive system for transmitting an operating force of a line winding handle as a rotating force to a spool, an interlock mechanism connecting the clutch controller to the clutch mechanism, and a clutch return mechanism for forcibly returning the clutch mechanism from a disengaged state to an engaged state in response to an operation of the handle. The clutch return mechanism includes a ratchet wheel mounted upstream of the clutch mechanism with respect to a direction of drive transmission through the rotational drive system, and a return member operatively connected to the interlock mechanism to be movable, when the clutch mechanism is disengaged, to an operative position to receive a returning force from the ratchet wheel, and retractable to an inoperative position under the returning force imparted from the ratchet wheel in response to a line winding operation of the handle, to engage the clutch mechanism. The clutch interlock mechanism includes an elastic flexion mechanism provided between the return member and clutch controller for absorbing a returning force exceeding a predetermined value imparted from the ratchet wheel.

9 Claims, 6 Drawing Sheets

CLUTCH CONTROL STRUCTURE FOR A FISHING REEL

BACKGROUND OF THE INVENTION

1. Field of the Invention

This invention relates to a clutch control structure for a fishing reel, and more particularly to a clutch control structure for a fishing reel having a clutch mechanism mounted in a rotational drive system for transmitting an operating force of a line winding device as a rotating force to a spool, a clutch controller operatively connected to the clutch mechanism through an interlock mechanism for engaging and disengaging the clutch mechanism, and a clutch return mechanism for forcibly returning the clutch mechanism from a disengaged state to an engaged state in response to an operation of the line winding device.

2. Description of the Related Art

Conventionally, the interlock mechanism is operatively connected to the clutch controller and a return member in a tight way without play.

With such a construction, when casting a bait with the clutch mechanism disengaged, the line winding device may inadvertently be turned through contact with an edge of a boat or by being hooked at an end of clothing. Then, an attempt is made to retract the return member forcibly to an inoperative position. However, the clutch controller held in a declutching position prevents the return member from moving to the inoperative position. As a consequence, the interlock mechanism and the like are subjected to an overload. Repetitions of such an incident could cause a fatigue failure.

To withstand such an overload, the interlock mechanism and the like must have a high degree of strength. Constructing the interlock mechanism and the like with a high degree of strength raises the manufacturing cost, which cannot be justified where these components are required to perform their basic functions only. Thus, there is room for improvement.

SUMMARY OF THE INVENTION

An object of the present invention is to provide a clutch control structure for a fishing reel having a simple modification made to the clutch interlock mechanism and the like to reduce the possibility of a fatigue failure due to repetitions, while allowing the interlock mechanism to perform the basic functions, without unduly raising the cost.

The above object is fulfilled, according to the present invention, by a clutch control structure for a fishing reel comprising a clutch return mechanism including a rotatable member mounted upstream of the clutch mechanism with respect to a direction of drive transmission through a rotational drive system, and a return member operatively connected to the clutch interlock mechanism to be movable, when the clutch mechanism is disengaged, to an operative position to receive a returning force from the rotatable member, and retractable to an inoperative position under the returning force imparted from the rotatable member in response to a line winding operation of the line winder, to engage the clutch mechanism; and an elastic flexion mechanism provided in the clutch interlock mechanism between the return member and the clutch controller for absorbing a returning force exceeding a predetermined value imparted from the rotatable member.

This construction has the following functions and effects:

A clutch returning force exceeding a normal returning force occurs when the line winder is inadvertently operated with the clutch mechanism disengaged and the clutch controller operated to set the clutch interlock mechanism and return member to a fixed state. Then, the elastic flexion mechanism is operated to prevent an overload from acting on the clutch interlock mechanism and clutch controller, while allowing the return member to move to the inoperative position.

When the clutch controller is not operated, only a normal operating force is applied to the return member by an operation of the line winder. Consequently, the clutch interlock mechanism and the like are not subjected to an overload, and the elastic flexion mechanism acts as part of the clutch interlock mechanism to switch the clutch controller to a clutch engaging position.

Thus, a simple modification consisting in addition of the elastic flexion mechanism is effective to reduce the possibility of a fatigue failure due to repetitions, while allowing the interlock mechanism and the like to have a compact construction adequate to assure a necessary basic strength. This provides an advantage in terms of manufacturing cost.

The foregoing and other objects, features and advantages of the invention will be apparent from the following more particular description of preferred embodiments of the invention, as illustrated in the accompanying drawings.

DETAILED DESCRIPTION OF THE PREFERRED EMBODIMENTS

Clutch control structures for a fishing reel according to the present invention will be described in detail with reference to the drawings.

Figure 2:
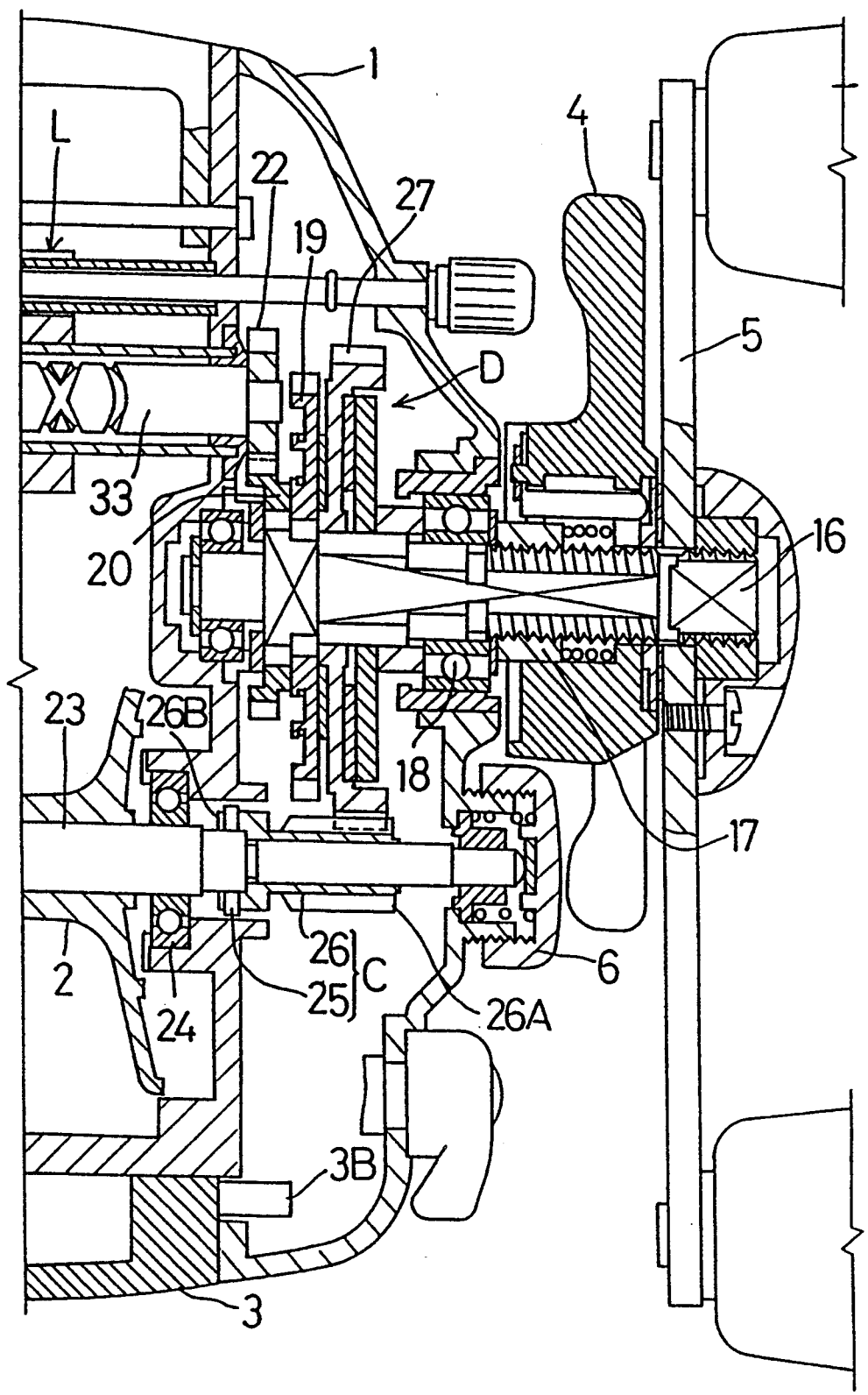
FIG. 2 is a plan view in cross section showing the interior structure of the right reel body.
Figure 3:
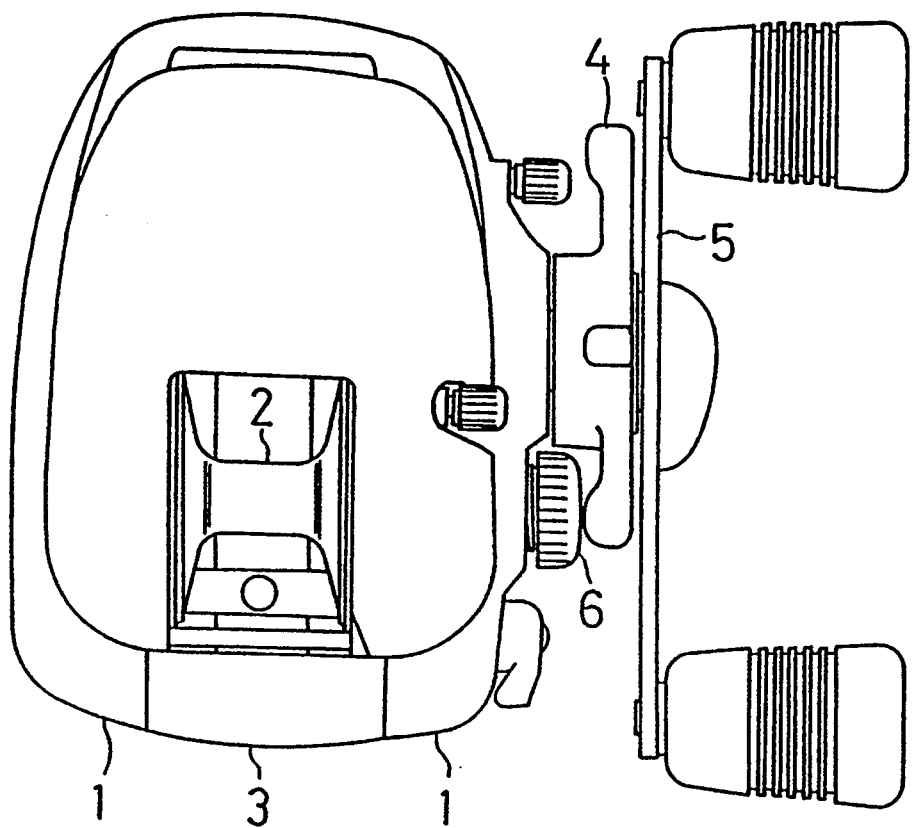
FIG. 3 is a plan view of the fishing reel.

FIGS. 2 and 3 show a baitcasting reel employing a clutch control structure in a first embodiment. The reel comprises fight and left side bodies 1 constituting a reel body and supporting therebetween a level wind mechanism L, a spool 2 for winding a fishing line, and a clutch controller 3. The right side body 1 supports a drag controller 4, a handle 5 acting as a line winder, and a cast controller 6.

As shown in FIG. 2, the right side body 1 rotatably supports a handle shaft 16 connected to the handle 5. The drag controller 4 is mounted on a nut 17 meshed with a screw portion of the handle shaft 16. When the drag controller 4 is turned, a pressing force corresponding to an amount of this turning operation is transmitted from the nut 17 to a drag mechanism D through a bearing 18.

Figure 1:
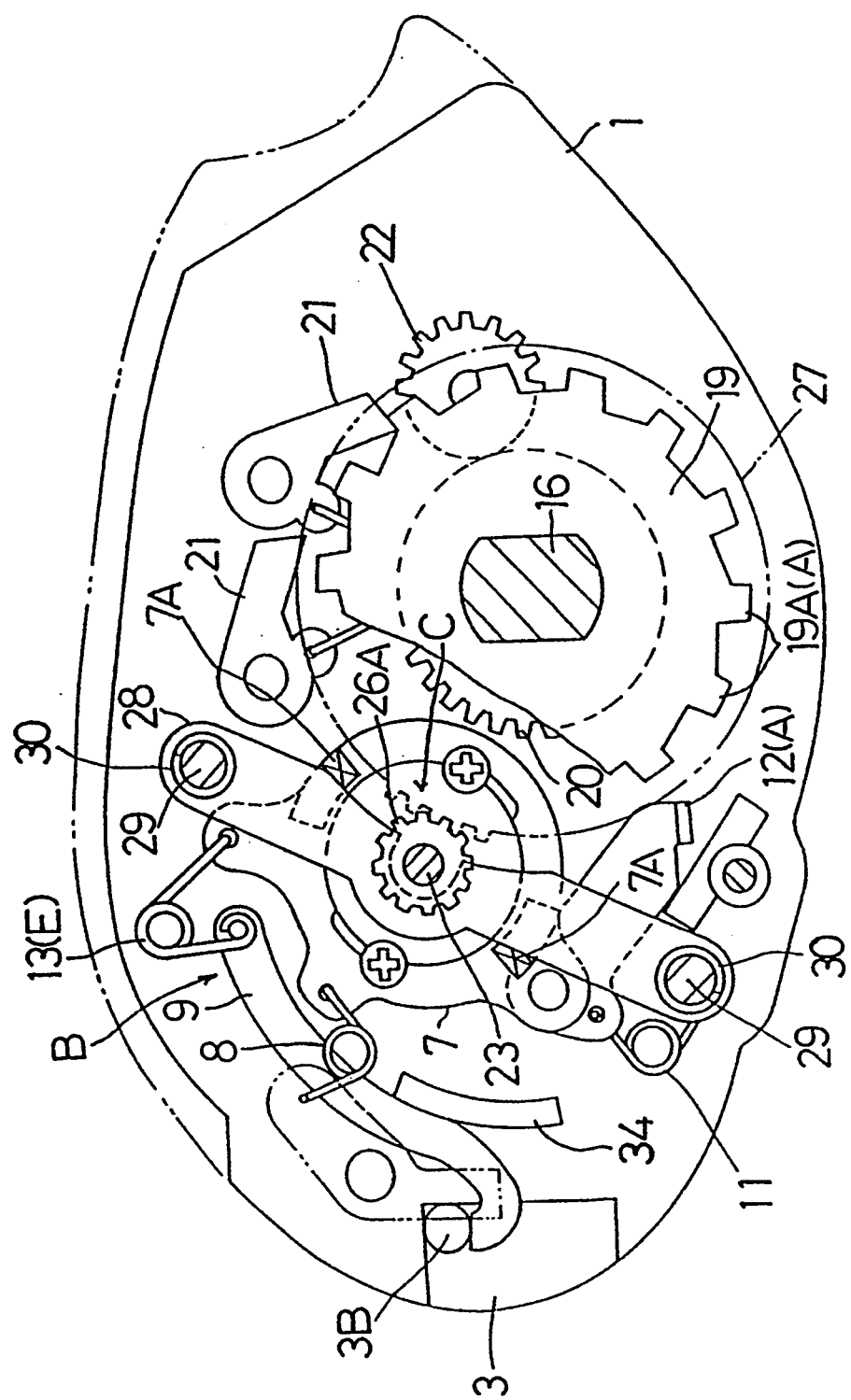
FIG. 1 is a side view showing in vertical section showing an interior structure of a right reel body of a fishing reel according to the present invention.

As shown in FIG. 2, the handle shaft 16 supports the drag mechanism D, a rotatable ratchet wheel 19 and a transmission gear 20. As shown in FIG. 1, pair of ratchet pawls 21 are engageable in different phases of rotation with teeth 19A of the ratchet wheel 19 to prevent backward turning of the handle 5. The transmission gear 20 is meshed with an input gear 22 mounted on a screw shaft 33 of the level wind mechanism L to drive the latter.

The spool 2 has a spool shaft 23 rotatable therewith. The spool shaft 23 is supported by bearings 24. The spool shaft 23 has an engaging pin 25 attached to an intermediate position thereof. Further, the spool shaft 23 supports a clutch sleeve 26 slidably mounted thereon for engaging the pin 25.

The clutch sleeve 26 has an input gear 26A meshed with an output gear 27 of the drag mechanism D. When the handle 5 is turned with an engaging portion 26B of the clutch sleeve 26 engaged with the pin 25, the spool 2 is rotated to wind the fishing line (not shown) thereon.

The pin 25 and clutch sleeve 26 constitute a clutch mechanism C. This clutch mechanism C is disengaged for a bait casting action.

As shown in FIG. 1, the clutch sleeve 26 is slidable by a shifter 28 supported on a pair of support shafts 29 extending parallel to the spool shaft 23. Coil springs 30 are mounted on the support shafts 29 to bias the shifter 28 to a clutch engaging position. An annular cam 7 is rotatably mounted coaxially with the spool shaft 23. The annular cam 7 defines a pair of cam surfaces 7A projecting therefrom to press and operate the shifter 28 to a declutching position.

A first toggle spring 8 acts on the annular cam 7 to set the annular cam 7 to a first control position to engage the clutch mechanism C and to a second control position to disengage the clutch mechanism C. The annular cam 7 is operatively connected to an interlocking pin 3B extending from the clutch controller 3 into the right side body 1, through an intermediate transmission member 9 movable to describe an arcuate track along a guide 34. Further, the annular cam 7 pivotally supports a return member 12 on which a second toggle spring 11 acts. When the clutch mechanism C is engaged, the return member 12 is switched to an inoperative position in which a free end thereof is retracted from the teeth 19A of ratchet wheel 19. When the clutch mechanism C is disengaged, the return member 12 is switched to an operative position in which the free end thereof can interfere with the teeth 19A of ratchet wheel 19. Thus, when the handle 5 is turned in a line winding direction, its operating force transmitted through the ratchet wheel 19 and return member 12 rotates the annular cam 7. As a result, the clutch mechanism C is engaged by the forces of the first toggle spring 8 and the coil springs 30 mounted on the support shafts 29. The annular cam 7 and intermediate transmission member 9 constitute a clutch interlock mechanism B. The return member 12 and ratchet wheel 19 constitute a clutch return mechanism A. The ratchet wheel 19 is called herein a rotatable member mounted in a drive system for rotating the spool 2.

A way in which the intermediate transmission member 9 is interlocked to the annular cam 7 will be described next. As shown in FIG. 1, a torsion spring 13 extends between an end of the intermediate transmission member 9 and annular cam 7. When the intermediate transmission member 9 and annular cam 7 move away from each other in excess of a predetermined distance, the torsion spring 13 flexes in a direction to bring the intermediate transmission member 9 and annular cam 7 closer together, thereby to absorb a returning force exceeding a predetermined value. When the handle 5 is inadvertently turned in the line winding direction during a bait casting operation with the clutch controller 3 depressed to disengage the clutch mechanism C, the return member 12 is retracted to the inoperative position under a returning force imparted from the ratchet wheel 19. Since, at this time, the clutch controller 3 is holding the intermediate transmission member 9 against return movement, the torsion spring 13 is flexed under a returning force exceeding a normal returning force. In this way, an excessive operating force applied to the clutch interlock mechanism B is mitigated. The torsion spring 13 acts as an elastic flexion mechanism E deformable to absorb a returning force exceeding a predetermined force imparted from the rotatable member.

Other embodiments will be described next.

Figure 4:
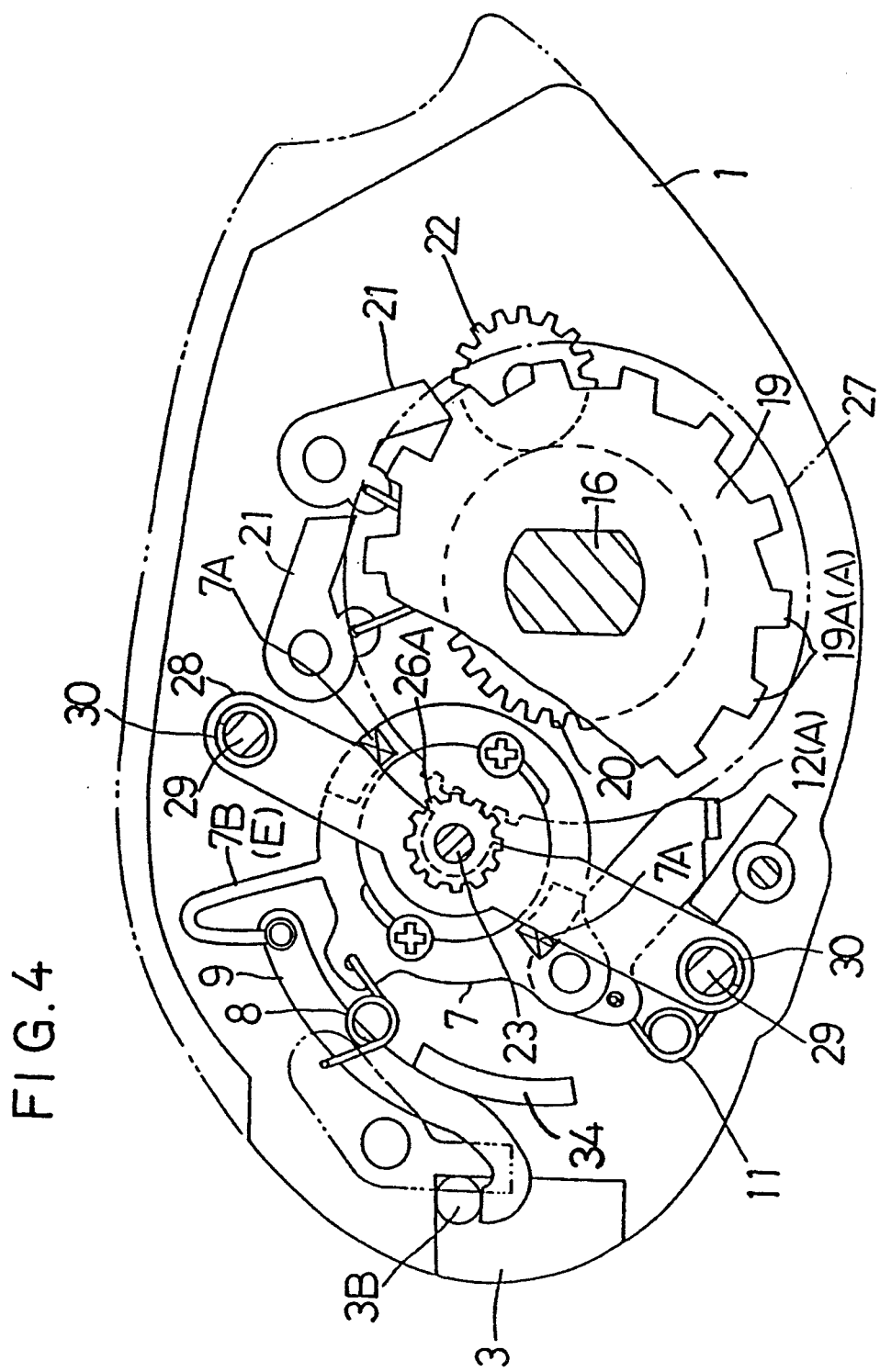
FIG. 4 is a side view in vertical section showing an elastic flexion mechanism in another embodiment of the invention.

(1) As shown in FIG. 4, the elastic flexion mechanism E may be modified such that the annular cam 7 includes a loop-like connection 7B to the forward end of the intermediate transmission member 9. When a returning force exceeding a predetermined value is applied to the return member 12 with the clutch mechanism C disengaged, the loop-like connection 7B is elastically deformable or stretchable to mitigate the returning force.

Figure 5:
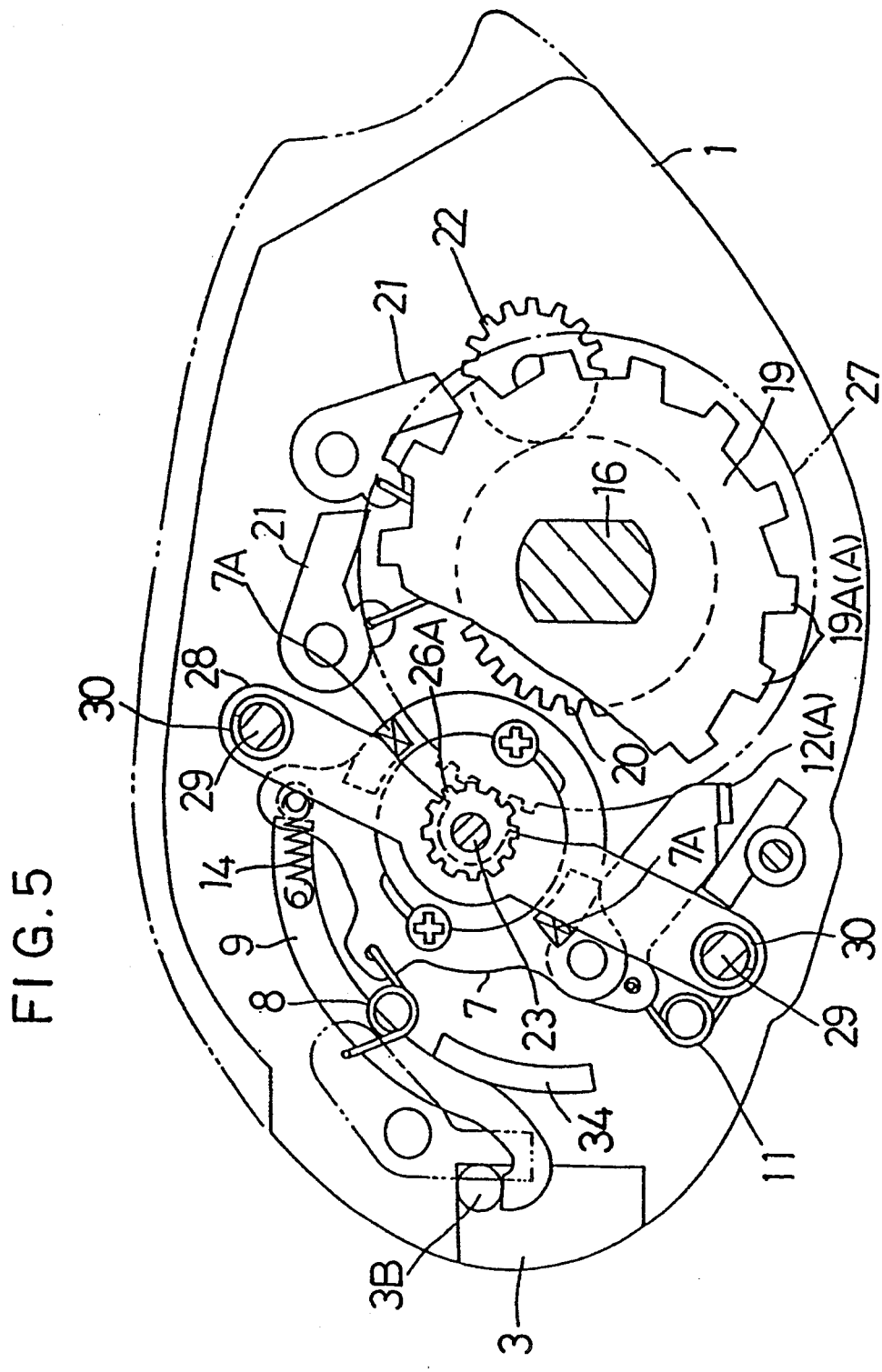
FIG. 5 is a side view in vertical section showing an elastic flexion mechanism in a further embodiment of the invention.

(2) As shown in Fig. 5, the elastic flexion mechanism E may comprise a tension spring 14 extending between the forward end of the intermediate transmission member 9 and a portion of the annular cam 7. The tension spring 14 is extendible under a returning force exceeding a predetermined value imparted from the rotatable member 19, to mitigate this returning force.

Figure 6:
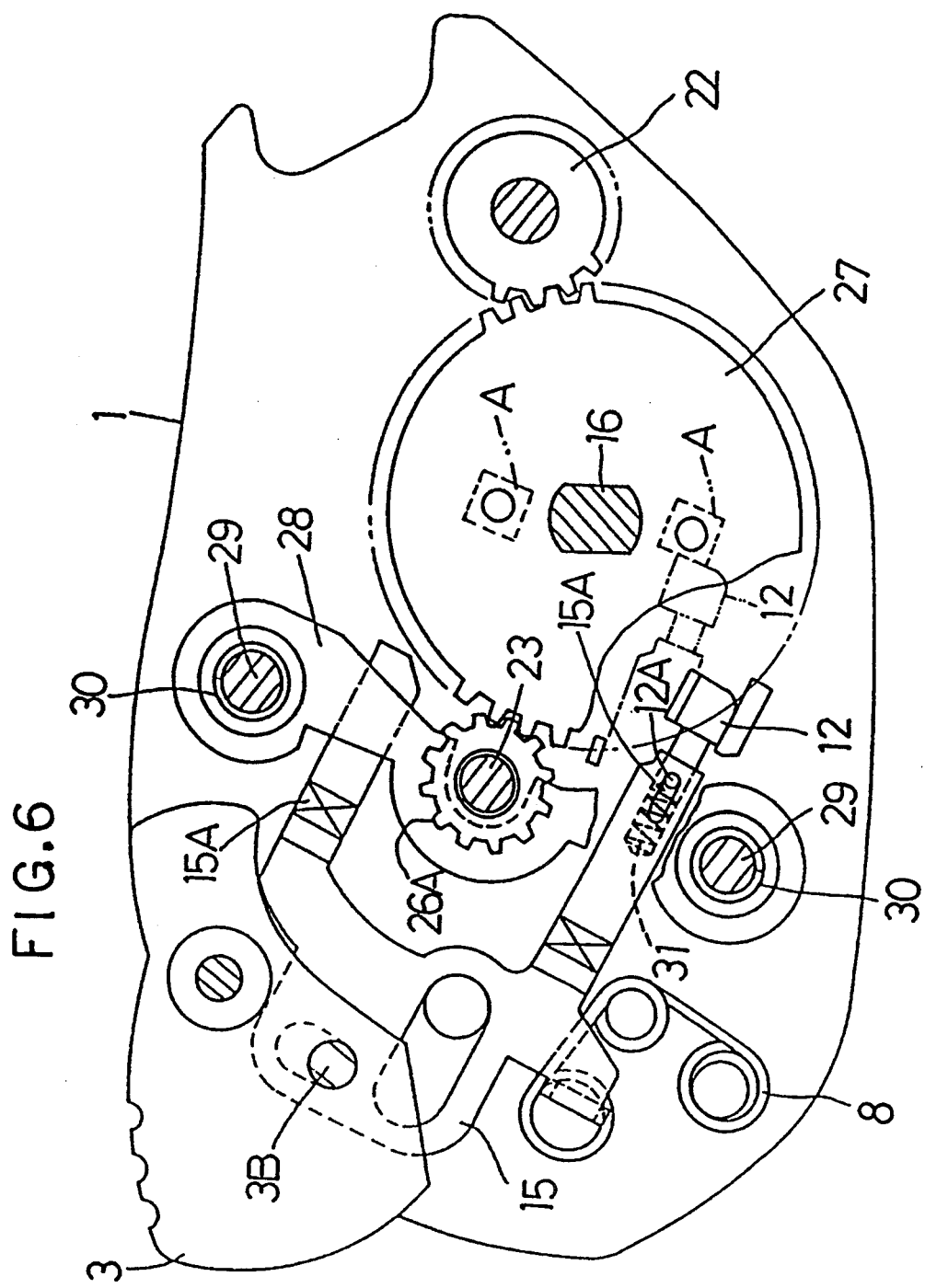
FIG. 6 is a side view in vertical section showing an elastic flexion mechanism in a still further embodiment of the invention.

(3) Further, the elastic flexion mechanism E may be modified as shown in FIG. 6. In this example, the shifter 28 is driven by a slide type clutch plate 15 instead of the rotary type annular cam 7. A return member 12 is connected to a forward end of the clutch plate 15. The clutch plate 15 has a connecting slot 15A formed in a forward end region thereof, while the return member 19 has a portion extending to a position adjacent the slot 15A and carrying an engaging pin 12A. The engaging pin 12A is engaged with the slot 15A to connect the return member 12 to the clutch plate 15. A compression spring 31 is mounted in the slot 15A for biasing the return member 12 and clutch plate 15 away from each other. When a returning force exceeding a predetermined value is applied to the return member 12 with the clutch mechanism C disengaged, the return member 12 moves toward the forward end of the clutch plate 15 against the biasing force of the compression spring 31. Consequently, the compression spring 31 is deformed to absorb the returning force.

(4) The clutch return mechanism A may be modified such that the rotatable member 19 includes a plurality of pins projecting from rotating surfaces thereof, and the return member 12 is movable to a position for interfering with these pins to return the clutch.

(5) Instead of using the ratchet wheel 19, a separate rotatable member may provided for the clutch returning purpose.

(6) The clutch controller 3 may be connected directly to the annular cam 7 or clutch plate 15.

What is claimed is:

1. A clutch control structure for a reel comprising:
   a clutch mechanism mounted on a rotational drive system for transmitting an operating force of a line winder as a rotating force to a spool;
   a clutch controller for engaging and disengaging said clutch mechanism;
   a clutch interlock mechanism for operatively interconnecting said clutch controller and said clutch mechanism, said clutch interlock mechanism including an annular cam, said annular cam moving said clutch mechanism between a disengaged state and an engaged state; and
   a clutch return mechanism for forcibly returning said clutch mechanism from the disengaged state to the engaged state in response to an operation of said line winder;
   wherein said clutch return mechanism includes a rotatable member mounted upstream of said clutch mechanism with respect to a direction of drive transmission through said rotational drive system, and a return member operatively connected to said clutch interlock mechanism to be movable, when said clutch mechanism is disengaged, to an operative position to receive a returning force from said rotatable member, and retractable to an inoperative position under the returning force imparted from said rotatable member in response to a line winding operation of said line winder, to engage said clutch mechanism,
   said clutch interlock mechanism including an elastic flexion mechanism provided between said annular cam and said clutch controller for absorbing a portion of the returning force exceeding a clutch-engaging force imparted from said rotatable member,
   the entirety of an operating force from said clutch controller being transmitted through said elastic flexion mechanism to said annular cam.

2. A clutch control structure as claimed in claim 1, wherein said clutch mechanism includes an engaging pin mounted on an intermediate position of a shaft of said spool, and a clutch sleeve engageable with said engaging pin.

3. A clutch control structure as claimed in claim 2, wherein said annular cam is rotatable coaxially with said spool shaft, and said clutch interlock mechanism further includes an intermediate transmission member movable in an arcuate way along a guide.

4. A clutch control structure as claimed in claim 3,' wherein said annular cam is selectively retainable by action of a first toggle spring in to a first control position to engage said clutch mechanism and a second control position to disengage said clutch mechanism.

5. A clutch control structure as claimed in claim 4, wherein said elastic flexion mechanism comprises a torsion spring extending between an end of said intermediate transmission member and said annular cam.

6. A clutch control structure as claimed in claim 4, wherein said elastic flexion mechanism comprises a loop-like connection of said annular cam extending and connected to a forward end of said intermediate transmission member, said loop-like connection being elastically stretchable to mitigate the returning force exceeding the predetermined value applied to said return member when said clutch mechanism is disengaged.

7. A clutch control structure as claimed in claim 4, wherein said elastic flexion mechanism comprises a tension spring extending between a forward end of said intermediate transmission member, said tension spring being stretchable to mitigate the returning force exceeding the predetermined value exerted from said rotatable member.

8. A clutch control structure as claimed in claim 1, wherein said line winder is a handle, and said rotatable member is a ratchet wheel mounted on a shaft of said handle.

9. A clutch control structure for a reel comprising:
   a clutch mechanism mounted on a rotational drive system for transmitting an operating force of a line winder as a rotating force to a spool;
   a clutch controller for engaging and disengaging said clutch mechanism;
   a clutch interlock mechanism for operatively interconnecting said clutch controller and said clutch mechanism, said clutch interlock mechanism including an annular cam rotatable about an axis of a spool shaft and an intermediate transmission member movable along an arcuate path along a guide member; and
   a clutch return mechanism for forcibly returning said clutch mechanism from a disengaged state to an engaged state in response to an operation of said line winder;
   wherein said clutch return mechanism includes a rotatable member mounted upstream of said clutch mechanism with respect to a direction of a drive transmission through said rotational drive system, and a return member operatively connected to said clutch interlock mechanism to be movable, when said clutch mechanism is disengaged, to an operative position to receive a returning force from said rotatable member, and retractable to an inoperative position under the returning force imparted from said rotatable member in response to a line winding operation of said line winder, to engage said clutch mechanism,
   said clutch interlock mechanism including an elastic flexion mechanism comprising a spring extending between a leading end of said intermediate transmission member and said annular cam for absorbing a portion of the returning force exceeding a clutch-engaging force imparted from said rotatable member.

* * * * *